No. 844,862. PATENTED FEB. 19, 1907.
J. K. GOURDIN.
NUT LOCK.
APPLICATION FILED SEPT. 15, 1905.
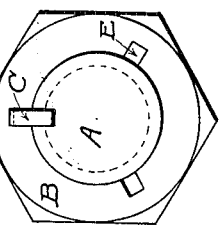
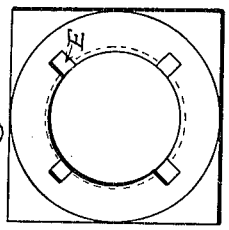
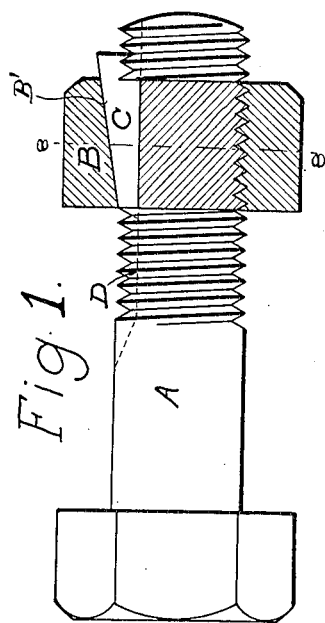
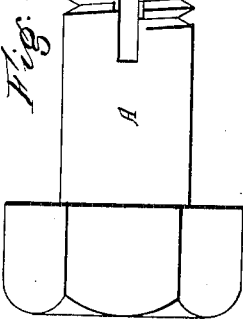
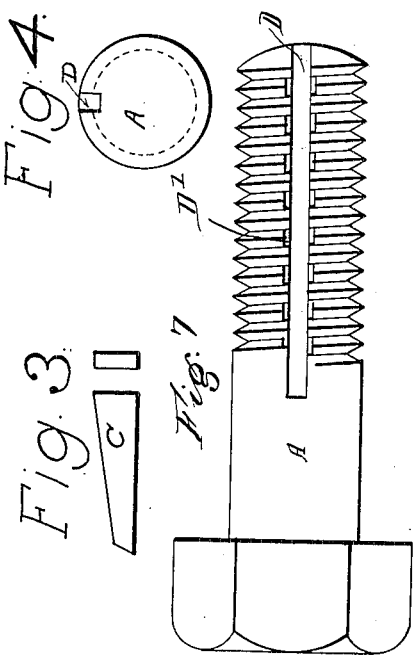
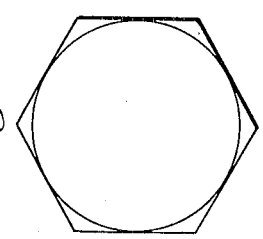
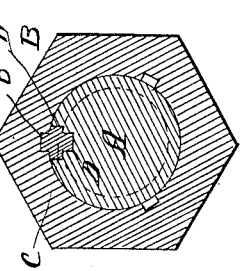
Witnesses.
Inventor.
JOHN K. GOURDIN
per
Attorneys

UNITED STATES PATENT OFFICE.

JOHN K. GOURDIN, OF PINEVILLE, SOUTH CAROLINA, ASSIGNOR OF ONE-HALF TO ROBERT L. MONTAGUE AND ROBERT P. TUCKER, OF CHARLESTON, SOUTH CAROLINA.

NUT-LOCK.

No. 844,862.  Specification of Letters Patent.  Patented Feb. 19, 1907.

Application filed September 15, 1905. Serial No. 278,633.

*To all whom it may concern:*

Be it known that I, JOHN K. GOURDIN, a citizen of the United States, residing at Pineville, in the county of Berkeley and State of South Carolina, have made certain new and useful Improvements in Nut-Locks, of which the following is a specification.

My invention is an improvement in nut-locks, and consists in certain novel constructions and combinations of parts, as will be hereinafter described and claimed.

In the drawings, Figure 1 is an elevation, partly in section, of a bolt and nut embodying my invention. Fig. 2 is an end elevation of the bolt and nut and locking device. Fig. 3 illustrates in side and end view the locking-key. Fig. 4 is a detail end elevation of the bolt. Fig. 5 is a detail elevation of the nut. Fig. 6 is an elevation of the bolt-head. Fig. 7 is a plan view of the bolt looking at the grooved side thereof, and Fig. 8 is a cross-section on about line 8 8 of Fig. 1.

The bolt A is provided across its threads with the longitudinal groove D, which receives the locking-key C, driven in practice into said groove and into a groove E in the threaded bore of the nut B. For convenience I provide the nut B with a plurality of grooves E, and the outer or base wall B' of each of these grooves tapers inwardly, as best shown in Fig. 1, for the purpose of contracting the cross-sectional area of the recess for the key C in order to secure a better spreading of said key laterally into the spaces between the nut and bolt in order to lock the key in place when driven home in the use of the invention. This inclination or taper of the base-walls B' of the grooves E also operates to increase the frictional resistance to the introduction of soft-metal keys, and thus increases the spreading tendency when the keys are driven home.

The key C is of soft metal. It may be lead such as is ordinarily employed in making shot, and when pressure is applied to the key it will be caused to spread laterally into the spaces in the threads of the bolt and of the nut, and thus lock the key from accidental displacement. To increase this locking effect of the key, I prefer to cut away portions of the threads at the opposite sides of the groove D in the bolt, usually every alternate thread for a distance of about one-sixteenth of an inch in bolts of ordinary size, whereby to form sockets D' at the opposite sides of the groove D, into which the soft metal of the key C will be forced in order to anchor the said key when the latter is hammered into the space between the bolt and nut, as will be understood from the drawings. The sockets D', extending laterally from the opposite sides of the groove D, constitute anchorages in which the soft metal of the key will be forced to lock the key from displacement.

In compressing the key in the space between the nut and bolt a suitable punch may be placed against the outer end of the key when the latter is fitted in place and the punch be hammered to force the soft-metal key bodily into the space between the bolt and key. When it is desired to remove the nut, a suitable wrench may be applied and extra force exerted to cut the soft-metal key and permit the nut to be removed.

Having thus described my invention, what I claim as new, and desire to secure by Letters Patent, is—

1. The combination substantially as herein described, of the bolt having a threaded portion and a groove across the same and having some of the threads broken away at their ends adjacent to the groove forming anchoring-sockets, the nut turning on the bolt and provided across its threaded bore with a groove which may be turned to coincide with that in the bolt, the base-wall of said groove being inclined or tapered whereby to decrease the cross-sectional area of the groove toward its inner end, and the soft-metal key fitted in the coincident grooves of the bolt and nut and forced under pressure laterally in the anchoring-sockets on opposite sides of the bolt and groove and into the spaces between the threads of the bolt and nut, substantially as set forth.

2. A bolt having a longitudinal groove crossing its threaded portion and having lateral anchoring-sockets at the sides of and communicating with said longitudinal groove.

3. A nut having a longitudinal groove across its threaded bore and having the base-wall of said groove inclined inwardly toward the inner end of the nut whereby to increase the frictional resistance to the introduction of a key, and the soft-metal key fitted to said groove the bolt having lateral anchoring-sockets at the sides of and communicating with said groove, substantially as set forth.

4. The combination of the bolt having a longitudinal groove across its threaded portion and having lateral anchoring-sockets at the sides of said longitudinal groove, a nut fitted to said bolt and having a groove across its threaded bore arranged to coincide with that in the bolt, and the soft-metal key driven into the coincident grooves of the bolt and nut, substantially as set forth.

JOHN K. GOURDIN.

Witnesses:
SOLON C. KEMON,
PERRY B. TURPIN.